May 23, 1944.　　W. R. FREEMAN　　2,349,416

VALVE CONSTRUCTION

Filed June 8, 1942

INVENTOR
W. R. FREEMAN
BY
ATTORNEY

Patented May 23, 1944

2,349,416

UNITED STATES PATENT OFFICE 2,349,416

VALVE CONSTRUCTION

Walter R. Freeman, Clayton, Mo., assignor to Wagner Electric Corporation, St. Louis, Mo., a corporation of Delaware Application June 8, 1942, Serial No. 446,252

2 Claims. (Cl. 60—54.6)

My invention relates to valves and more particularly to a valve mechanism for a master cylinder device of a fluid pressure actuating system.

One of the objects of my invention is to provide an improved valve mechanism for association with the outlet of a master cylinder device to control the return flow of fluid to said master cylinder device.

Another object of my invention is to produce a valve mechanism for association with the outlet of a master cylinder device which will cause a predetermined pressure to be retained in the actuating system connected to the master cylinder device but will not cause a sluggish return of fluid to the master cylinder during the releasing operation.

Figure 1:
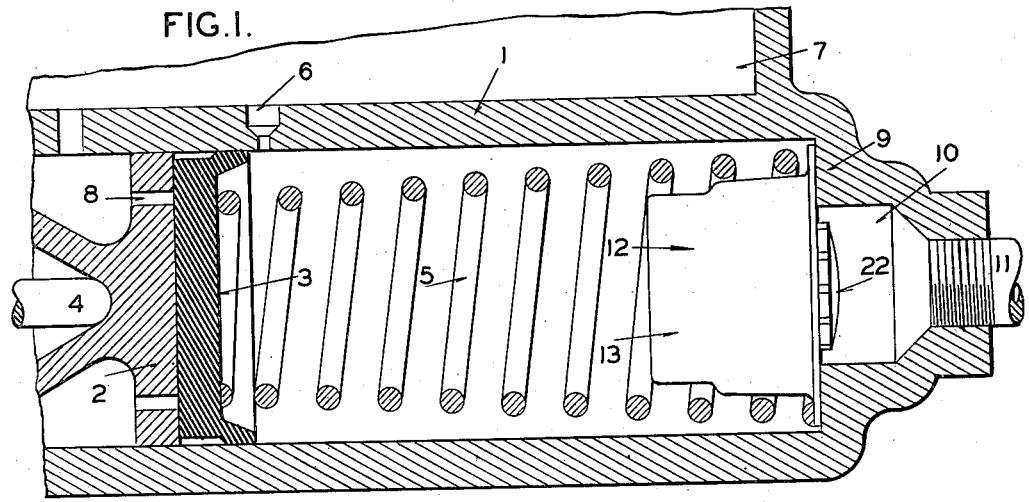
Figure 2:
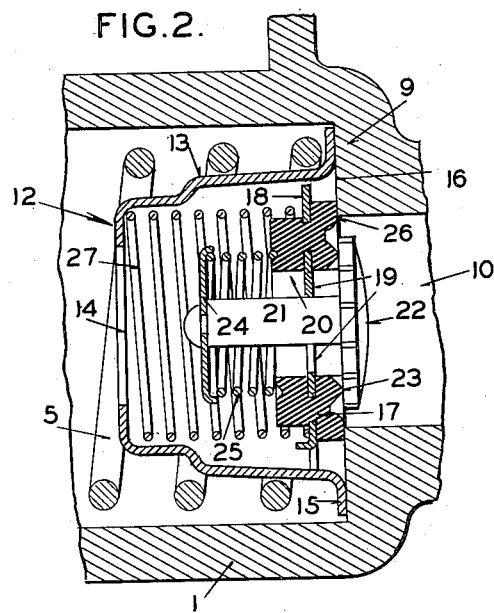

Other objects of my invention will become apparent from the following description taken in connection with the accompanying drawing in which Figure 1 is a partial sectional view of a master cylinder device having a valve mechanism embodying my invention associated therewith; and Figure 2 is an enlarged sectional view of the valve mechanism.

Referring to the drawing and particularly to Figure 1, there is disclosed a portion of a well-known master cylinder construction comprising a cylinder 1 within which is reciprocable a piston 2 having a packing cup 3 associated with its head. The piston is adapted to be reciprocated by a piston rod 4 and returned to its normally inoperative position by a spring 5. When the piston is in retracted position as shown, packing cup 3 is positioned just rearwardly of a compensating porthole 6 for placing the cylinder ahead of the piston in communication with the reservoir 7. The head of the piston is provided with passages 8 which permit fluid at the rear of the head of the piston to flow past the lip of the cup during the retractile stroke of the piston in the event a sub-atmospheric pressure should tend to develop in the cylinder ahead of the piston.

The forward wall 9 of the cylinder is provided with an outlet port 10 which is connected to a conduit 11 for carrying fluid under pressure to any suitable actuating motor for operating any desired device, as for example, the brakes of a motor vehicle. Associated with the outlet port 10 of the cylinder is my improved double acting valve mechanism 12 for controlling the flow of fluid from and to the cylinder as the piston is reciprocated. The valve mechanism is so constructed as to permit the fluid to flow freely from the cylinder to the conduit and to prevent fluid from flowing to the cylinder from the conduit unless the fluid in the conduit is above a predetermined value. The valve mechanism is associated with the forward end of the retractile spring 5 of the piston in such a manner that this spring will hold the valve mechanism in a proper position for operation. The retractile spring, however, does not have any effect whatsoever on the operation of the valve mechanism in so far as its actual function is concerned in controlling the return flow of fluid from conduit 11.

Referring now specifically to Figure 2, the valve mechanism is enclosed within a cup-shaped member 13 having an opening 14 in its bottom and a flange 15 at its top. The cup is of such size that it can be inserted in the end of coil retracting spring 5 so that the end of this spring engages flange 15 to maintain the cup in position where its flanged end is engaged with the end wall surface 16 of the master cylinder device. Within the cup-shaped member is an annular resilient valve member 17 made of rubber, rubber compound, synthetic rubber or some other like material and this valve member has embedded therein an annular metal disc 18 provided with prongs 19 which project radially inwardly into the opening 20 through the valve member in order to form a guide for a valve stem 21. The disc is made to loosely fit within the cup-shaped member and thus supported thereby. The valve stem 21 is provided with a valve element 22 which is adapted to cooperate with an annular ridge 23 on the forward surface of the valve member, said ridge surrounding the opening 20. The rear end of the valve stem carries a disc 24 and interposed between this disc and the valve element is a very light spring 25, said spring normally maintaining the element 22 in engagement with ridge 23.

The resilient valve member 17 on the same surface as ridge 23 is provided with an annular surface 26 for cooperation with the surface 16 of the end wall 9 of the cylinder closely adjacent the outlet port 10. This surface 26 is biased into engagement with the end wall surface by a spring 27 interposed between the bottom of the cup-shaped member and disc 18 embedded in the valve member. Spring 27 is of such strength as to maintain the desired pressure which is to be retained in the system to which conduit 11 is connected. Thus if it is desired to maintain ten pounds per square inch pressure in the system the spring will be of such strength that it will hold surface 26 seated when the pressure in the conduit and the system connected therewith drops to this figure. Higher pressure will be relieved by the forcing of surface 26 off the end surface of the cylinder. Since the retractile spring 5 of the master cylinder piston is of a strength much greater than spring 27, it is seen that there will be no danger of the force exerted by this latter spring having its value changed.

From the foregoing description of my invention it is apparent that when the master cylinder piston is operated and pressure is developed, the valve element 22 will be readily unseated and fluid will flow through the opening 20 to conduit 11. When piston 2 is permitted to return to its retracted position by the action of spring 5, fluid under pressure in conduit 11 and the system will cause the valve member 17 to compress the spring 27 so that surface 26 is unseated from the end surface of the cylinder. The fluid in the system will then quickly return to the master cylinder device and the flow will not be stopped until the pressure in the system has decreased to the value determined by spring 27. It is to be noted that spring 27 maintains a predetermined pressure at all times and its exerted force will not be affected by the compressed condition of spring 5 as determined by the position of the master cylinder piston 2 as is the case in prior constructions, for example, that shown in Bowen Patent No. 1,841,354, issued January 19, 1932, where the end of the retracting spring acts directly upon the valve member 17. In such prior construction the force of the retracting spring holding the surface of the valve member seated would be very great at the beginning of the return stroke of the piston. This causes a sluggish return of the fluid and also a tendency to establish a sub-atmospheric pressure in the cylinder ahead of the piston. Thus excessive fluid will be pulled into the cylinder past the piston packing cup and consequently this over-supply of fluid has to be pushed out of the compensating port after the piston has reached its retracted position. Since the port is very small, it takes time for this excess fluid to be forced back to the reservoir and, therefore, the fluid under pressure in the system is not released as quickly as desirable under some circumstances. By the use of my improved valve mechanism this disadvantage does not occur. Any pressure above that determined by the force of spring 27 can be quickly released as the master cylinder piston is returned. Thus there will not be any tendency to establish a sub-atmospheric pressure in the cylinder ahead of the master cylinder piston which will cause overcharging of the system and the necessity for excess fluid to be pushed back into the reservoir through the small compensating port.

From the above description it is apparent that my improved valve mechanism is of simple construction and very easily installed. The master cylinder spring is employed to hold the supporting cup 13 in position at the end of the cylinder so that spring 27 can function properly to maintain a predetermined pressure on the valve member 17 and hold the annular surface 26 seated. The force of the retractile spring 5 is at no time transmitted to the valve member.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In combination with a retracting spring for a fluid pressure producing piston and a cylinder having an outlet port situated in its forward end wall remote from the piston and connected to a fluid pressure actuating system, said spring being interposed between the outlet port end of the cylinder and the piston, a valve mechanism for permitting fluid under a very low pressure to flow from the cylinder through the outlet when the piston is moved forwardly in the cylinder but preventing fluid from returning to the cylinder from the system when the piston is retracted except when above a predetermined pressure greater than said low pressure, said valve mechanism comprising a supporting member having a portion held between the outlet port end of the spring and the wall end of the cylinder which surrounds the outlet port, a valve member having an opening therethrough and carried by the supporting member, said valve member having a surface for engaging the end wall surface of the cylinder inwardly of that cooperating with the supporting member, a spring interposed between the supporting member and the valve member for exerting a predetermined constant force to place said last named surfaces in pressure engagement, and check valve means for the opening in the valve member preventing flow of fluid through the valve member toward the cylinder when the valve member is in operative position.

2. In combination with a retracting spring for a fluid pressure producing piston and a cylinder having an outlet port situated in its forward end wall remote from the piston and connected to a fluid pressure actuating system, said spring being interposed between the outlet port end of the cylinder and the piston, a valve mechanism for permitting fluid under a very low pressure to flow from the cylinder through the outlet when the piston is moved forwardly in the cylinder but preventing fluid from returning to the cylinder from the system when the piston is retracted except when above a predetermined pressure greater than said low pressure, said valve mechanism comprising a perforated cup-shaped member having a portion held between the outlet port end of the spring and the end wall of the cylinder which surrounds the outlet port, a valve member of yieldable material having an opening therethrough and carried by the cup-shaped member, said valve member having a surface for engaging the end wall surface of the cylinder surrounding the outlet, a spring interposed between the bottom of the cup-shaped member and the valve member for exerting a predetermined constant force to place said last named surfaces in pressure engagement, a check valve element for engaging the surface surrounding the opening in the valve member for preventing flow of fluid through the valve member toward the cylinder when the valve member is in operative position, a stem on the check valve element extending through the valve member opening into the cup-shaped member, and a weak spring interposed between the inner end of the stem and the valve member, said last named spring and inner end of the stem lying wholly within the cup-shaped member.

WALTER R. FREEMAN.